Feb. 26, 1957   W. D. LUDWIG   2,782,801

SLIDING VALVE SPOOL SEAL

Filed Jan. 16, 1953

INVENTOR.
WALTER D. LUDWIG.
BY
Thos. S. Donnelly
ATTORNEY.

2,782,801
SLIDING VALVE SPOOL SEAL
Walter D. Ludwig, Royal Oak, Mich.

Application January 16, 1953, Serial No. 331,573

3 Claims. (Cl. 137—625.48)

My invention relates to a new and useful improvement in a sliding valve spool seal and is adapted for use on a sliding valve spool operating in a bore into which air or fluid is brought under pressure.

It is an object of the present invention to provide a seal on a sliding valve so arranged and constructed that it will be highly efficient in use and will, when subjected to pressure, seal tighter than when it is not subjected to pressure.

Another object of the present invention is the provision of a sliding valve spool seal mounted on a sliding valve stem in such a manner that it will be held in rigid position and when subjected to pressure will expand to a slightly larger diameter to more securely seal against the bore in which it is sliding.

Another object of the invention is the provision in a sliding valve spool of a construction whereby the spool is provided with a plurality of spaced apart flanges and spaced apart channels with the sealing material molded around the flanges and filling the channels and having a tapered face which is subjected to pressure.

Other objects will appear hereinafter.

It is recognized that various modifications and changes may be made in the detail of structure illustrated without departing from the invention and it is intended that the present disclosure shall be considered to be but the preferred embodiment.

Forming a part of this application are drawings in which.

Figure 1:
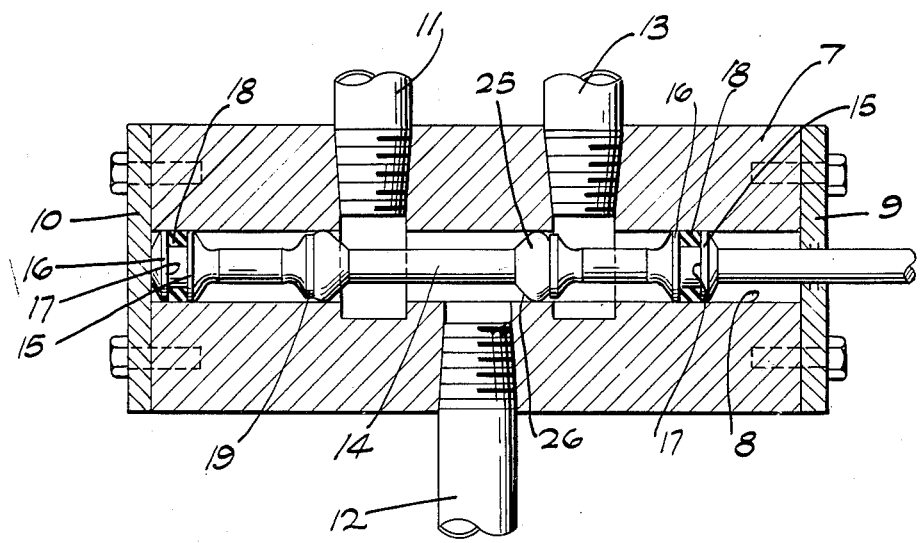
Fig. 1 is a central sectional view of a valve housing showing the invention in side elevation.

In the drawings I have shown the invention used with a valve housing 7 having a bore 8 formed therethrough which is closed at its opposite ends by the end plates 9 and 10. An inlet delivery pipe 12 adapted to deliver fluid under pressure into the bore 8. Outlet delivery pipes 11 and 13 communicate with the bore and the valve seal which forms the present invention is used to control communication of the pipe 12 with pipe 13 or pipe 11 selectively.

Slideable in the bore 8 is a valve spool having spaced apart flanges 15 and 16 which serve to form a channel 17 in which a sealing ring 18 is positioned. Formed on the spool 14 between these parts 15 and 16 is a pair of sealing valves.

As shown on the drawings these sealing valves are spaced apart and each one is similarly constructed so that the description of one will suffice for both. Formed on the stem 14 is a flange 19 spaced from which, by the channel 21, is a smaller flange 20 which, in turn, is spaced by the channel 23 from a still smaller flange 22, and the groove 24 is formed in the stem or spool 14. Molded and bonded around the groove 24 and the flanges 20 and 22 and groove 20 and sealed against the face of the flange 19 is a body of flexible material such as rubber or the like which has a tapered face 26. This tapered face is always directed toward the pressure side.

It will be noticed that the sealing body 25 extends beyond the periphery of the flange 19. When pressure is directed against the face 26 this body has a tendency to bulge outward so that its periphery presses more closely against the inner surface of the bore 8 and serves as an effective sealing. The construction is such that the greater the pressure the tighter the seal will seal so that the seal may be used under very high pressure. By constructing the valve spool in the manner indicated with the grooves and flanges and the rubber sealing material molded around the same, a construction is provided which assures the proper retention.

Experience has shown that with a sliding spool valve seal constructed in this manner a high degree of efficiency is obtained and a durable product is effected and the possibility of the seal breaking loose from the valve spool eliminated.

Figure 2:
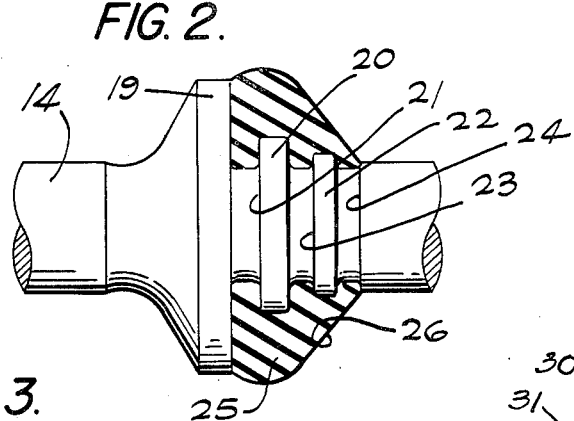
Fig. 2 is a fragmentary side elevational view of a valve spool showing the invention in cross section.
Figure 3:
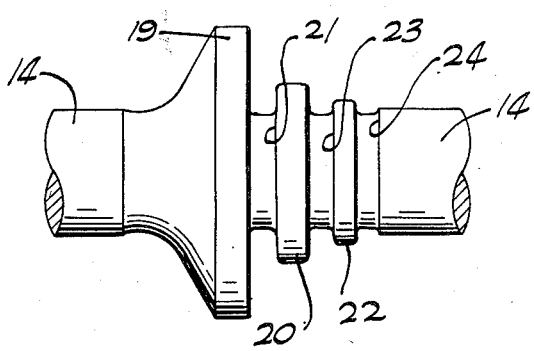
Fig. 3 is a side elevational view of a fragment of the valve spool showing the sealing body molded thereon.
Figure 4:
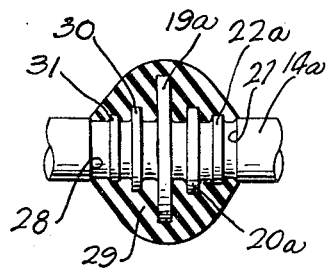
Fig. 4 is a fragmentary side elevational view of a valve spool provided with another embodiment of the invention.

In Fig. 4 I have shown a slight modification in which the stem 14a corresponds to the member 14 shown in Fig. 1 with the flanges 22a, 20a and 19a corresponding to those shown in Fig. 1. At the exterior of the flange 22a there is formed groove 27. At the opposite side of the central flange 19a are the flanges 30 and 31 corresponding to the flanges 22a and 20a and at the exterior of the flange 31 there is a peripheral groove 28. Molded around these flanges, so as to entirely imbed them, is a yieldable mass 29 corresponding to the part 25 shown in Fig. 2. This part of the structure is desirable in some types of operation when the seal is exposed to pressure from either direction, and is such that a very firm mounting of the molded material on the stem 14a is fixed.

What I claim is:

1. A valve structure of the class described, comprising: a valve housing having a bore formed therethrough communicating with inlet and outlet ports; a valve spool body slidable in said bore; a plurality of stepped, peripherally disposed cylindrical flanges formed on said body intermediate its ends; said flanges being spaced apart by channels of equal width and which extend inwardly beyond the surface of the spool body; a body of flexible sealing material molded on said stepped flanges and filling said channels and engaging a face of the largest of said stepped flanges and projecting beyond the periphery of said largest flange and engaging the inner surface of said bore; and, the outer surface of said sealing body tapering away from the periphery thereof to the periphery of the spool body.

2. In a sliding valve spool structure of the class described, comprising: a valve spool body slidable in a bore having ports connected therewith; a plurality of flanges on said spool body projecting outwardly beyond the periphery of said body intermediate the ends thereof and being axially spaced in relation to each other; said flanges diminishing in diameter proceeding from one end of said plurality of flanges; a body of sealing material molded around the smaller of said flanges and engaging the face of the largest of said flanges and projecting beyond the periphery thereof and having a tapered face on one end thereof proceeding from the periphery of the sealing body to the periphery of said spool body; and a tapered face on the other end thereof proceeding from the periphery of the sealing body to the periphery of the largest of said flanges.

3. In a sliding valve spool structure of the class described, comprising: a valve spool body slidable in a bore having ports connected therewith; a plurality of flanges on said spool body projecting outwardly beyond the periphery of said body intermediate the ends thereof and being axially spaced in relation to each other; said flanges diminishing in diameter proceeding from one end of said plurality of flanges; a body of sealing material molded around the smaller of said flanges and engaging the face of the largest of said flanges and projecting beyond the periphery thereof; and having a tapered face proceeding from the periphery of the sealing body to the periphery of said spool body.

References Cited in the file of this patent

UNITED STATES PATENTS

| 2,278,122 | Broecker | Mar. 31, 1942 |
| 2,300,498 | Goff | Nov. 3, 1942 |
| 2,473,591 | Killner | June 21, 1949 |
| 2,641,278 | Eplett | June 9, 1952 |

FOREIGN PATENTS

| 542,453 | Great Britain | of 1942 |
| 578,932 | Great Britain | of 1946 |